(No Model.)

F. TROWBRIDGE.
BOILER CLEANER.

No. 459,798. Patented Sept. 22, 1891.

Witnesses:
J. B. McGinn.
H. J. Bernhard.

Inventor.
Frank Trowbridge
By his Attorneys
Edson Bros.

UNITED STATES PATENT OFFICE.

FRANK TROWBRIDGE, OF FOND DU LAC, WISCONSIN.

BOILER-CLEANER.

SPECIFICATION forming part of Letters Patent No. 459,798, dated September 22, 1891.

Application filed January 8, 1891. Serial No. 377,134. (No model.)

*To all whom it may concern:*

Be it known that I, FRANK TROWBRIDGE, a citizen of the United States, and a resident of Fond du Lac, in the county of Fond du Lac and State of Wisconsin, have invented certain new and useful Improvements in Boiler-Cleaners; and I do hereby declare the following to be a full, clear, and exact description of the invention, such as will enable others skilled in the art to which it appertains to make and use the same.

This invention relates to improvements in devices for removing incrustation or "scale" from the pipes of steam-boilers; and it has for its object to provide a simple, cheap, and effective means for introducing the scale-removing substance into the interior of a boiler.

A further object is to provide devices especially adapted for use in preparing potatoes for introduction into boilers, which substance has been found by experience to be a most efficient medium for removing incrustation from steam-boiler pipes.

With these ends in view the invention resides in the combination, with a boiler, of a vessel secured exteriorly to the boiler, but communicating with the interior of the same and adapted to receive the scale-removing substance, means within said vessel for agitating and reducing its contents, and a valve or cut-off for establishing or cutting off communication between the exterior vessel and the interior of the boiler.

The invention further consists in the peculiar construction and arrangement of parts, as will be hereinafter more fully described and claimed.

In order that others may understand the invention, I have illustrated the same in the accompanying drawings, in which—

Figure 1:
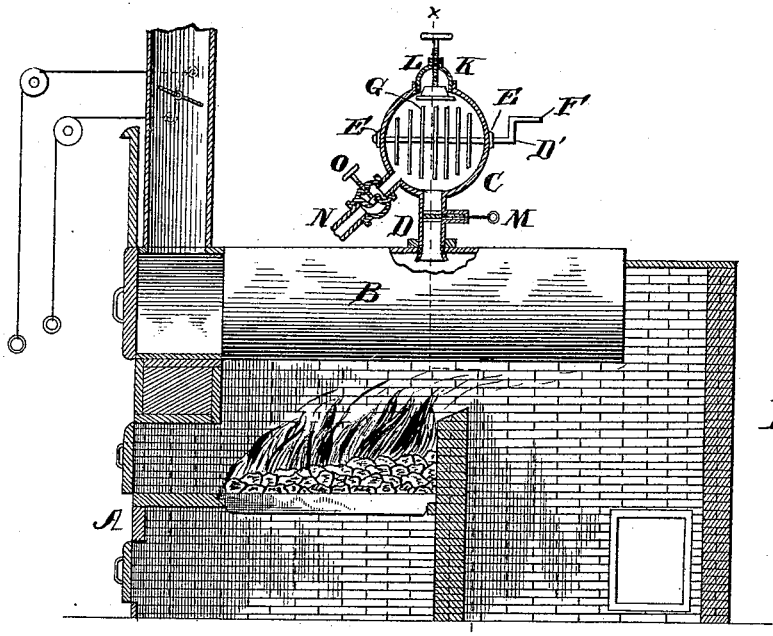
Figure 2:
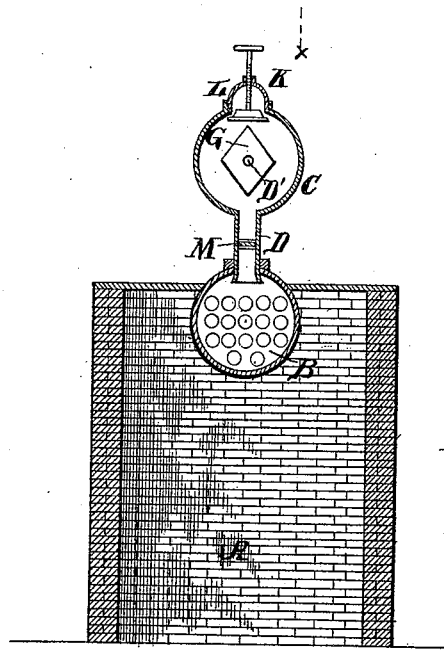

Figure 1 is a longitudinal vertical sectional view through a steam-boiler having my improvement applied thereto. Fig. 2 is a transverse vertical sectional view on the line $x\ x$ of Fig. 1.

Like letters of reference denote corresponding parts in both figures of the drawings, referring to which—

A designates a furnace, and B a boiler, both of the ordinary construction. On the upper side of the boiler B is a vessel or drum C, which is suitably secured in position and is preferably circular in cross-section. From the lower side of this drum or vessel extends a conduit or pipe D, which passes through the upper side of the shell of the boiler and the lower end of which terminates in the steam-space in the boiler.

D′ designates a horizontal shaft which is journaled in the vessel or drum C, and said shaft extends transversely across the interior of said vessel and passes through a stuffing-box E, the outer end of the shaft being provided with a crank or handle F for conveniently rotating the same. On the shaft D is rigidly secured a series of knives or cutters G, which are situated within the vessel or drum C and which are preferably diamond-shaped.

Access is had to the interior of the drum or vessel C through a hand-hole K in the top thereof, which is normally closed by a cover L.

Communication between the vessel or drum C and the interior of the boiler is established or cut off, as desired, by means of a gate-valve M, of the ordinary construction, which is situated in the pipe D.

N designates an outlet or discharge pipe which is connected at one end with the drum or vessel C, and in this pipe N is provided a valve O to enable the steam in the vessel to escape into the air.

The operation of my invention is simple, and may be briefly stated as follows: The valve M is closed and potatoes are introduced through the hand-hole K, after which the cover or lid is replaced. The valve M is partially withdrawn to admit steam from the boiler into the drum or vessel C to reduce the potatoes to a pulpy condition, and the mass falls or is precipitated through the pipe D and into the interior of the boiler B. Should the potatoes remain in the drum or become clogged, the shaft D′ is rotated by means of its crank F, and the knives or cutters G operate to agitate the contents of the drum C and force the steamed potatoes into the pipe D and thence into the boiler. After the desired quantity has been admitted to the boiler the gate-valve M is closed and the valve O is opened to permit the steam in the drum C to escape through the pipe N into the outer air.

I am aware that changes in the form and proportion of parts and details of construction of the devices herein shown and described as an embodiment of my invention can be made without departing from the spirit or sacrificing the advantage of my invention, and I therefore reserve the right to make such changes as fairly fall within the scope of my invention.

Having thus described my invention, what I claim as new, and desire to secure by Letters Patent, is—

1. The combination of a boiler, an exterior drum or vessel secured to and communicating with the interior of the boiler, an agitator within said drum for agitating the contents thereof, and a valve or cut-off for cutting off communication between the exterior drum and the boiler, as and for the purpose described.

2. The combination of a boiler, an exterior drum or vessel provided with an opening on its upper side and communicating with the interior of the boiler, the cutter-carrying shaft journaled in the drum or vessel and having a crank, and a valved escape-pipe leading from the vessel, all combined and arranged substantially as shown and described, for the purpose specified.

In testimony whereof I affix my signature in presence of two witnesses.

FRANK TROWBRIDGE.

Witnesses:
W. H. BOWE,
G. F. STEWART.